United States Patent
Birleson

(10) Patent No.: US 6,653,969 B1
(45) Date of Patent: *Nov. 25, 2003

(54) DISPERSIVE JAMMER CANCELLATION

(75) Inventor: Stanley V. Birleson, Rowlett, TX (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/019,505

(22) Filed: Feb. 19, 1993

(51) Int. Cl.$^7$ ............................................. G01S 7/36
(52) U.S. Cl. ................ 342/16; 342/17; 342/379; 342/381
(58) Field of Search .................. 342/16, 17, 18, 342/19, 39, 379, 381, 382, 384

(56) References Cited

U.S. PATENT DOCUMENTS

| | | | | |
|---|---|---|---|---|
| 3,982,245 A | * | 9/1976 | Soule, Jr. et al. | 342/379 |
| 4,070,675 A | * | 1/1978 | Daniel et al. | 342/380 |
| 4,638,318 A | * | 1/1987 | Gutleber | 342/382 |
| 4,652,881 A | * | 3/1987 | Lewis | 342/160 |
| 4,672,378 A | * | 6/1987 | Drabowitch et al. | 342/17 |
| 4,757,265 A | * | 7/1988 | Peacher | 342/17 X |
| H739 H | * | 2/1990 | Gutleber | 342/384 |
| H740 H | * | 2/1990 | Gutleber | 342/384 |
| H792 H | * | 6/1990 | Sanval et al. | 342/17 |
| 5,252,983 A | * | 10/1993 | Sezai | 342/382 |
| 5,291,209 A | * | 3/1994 | Evans et al. | 342/381 |
| 5,294,933 A | * | 3/1994 | Lee et al. | 342/159 |
| 5,296,865 A | * | 3/1994 | Lewis | 342/384 |
| 5,307,069 A | * | 4/1994 | Evans | 342/19 |
| 5,359,329 A | * | 10/1994 | Lewis et al. | 342/17 |
| 5,361,073 A | * | 11/1994 | Hansen | 342/381 |
| 5,365,234 A | * | 11/1994 | Lewis | 342/16 |
| 5,600,326 A | * | 2/1997 | Yu et al. | 342/17 |
| 6,121,914 A | * | 9/2000 | Cavelos et al. | 342/16 |
| 6,166,689 A | * | 12/2000 | Dickey, Jr. et al. | 342/381 |
| 6,268,821 B1 | * | 7/2001 | Shrader et al. | 342/17 |
| 6,297,772 B1 | * | 10/2001 | Lewis | 342/381 |
| 6,420,992 B1 | * | 7/2002 | Richmond | 342/14 |

* cited by examiner

*Primary Examiner*—John B. Sotomayor
(74) *Attorney, Agent, or Firm*—Baker Botts L.L.P.

(57) ABSTRACT

Generating a secondary beam (11) slightly offset from the main data collection beam (9) and obtaining hot clutter reference to be used in a conventional side lobe jammer processing algorithm (31). Advantage is taken of the typical geometries of a standoff jammer (1) which provides nearly matched dispersion characteristics of the jammer RF when viewed with the two received beams. The important parameter is dispersion relative to the received bandwidth. The secondary beam, which may be identical copy of the main beam except for target information, is placed offset by approximately two beam widths toward the jammer. The offset distance is chosen so that there is minimal and preferably no overlap in the main beam footprint on the ground but is as close as possible thereto. If there is overlap, then there is a chance that the target will appear in both beams and therefore be suppressed.

20 Claims, 1 Drawing Sheet

DISPERSIVE JAMMER CANCELLATION

BACKGROUND OF THE INVENTION

1. Field of the Invention

This invention relates to a method and system for canceling jamming signals utilized as a countermeasure against radar transceivers and the like and is therefore a countermeasure for the countermeasure.

2. Brief Description of the Prior Art

Improved jammer capability and ultra-sensitive radars have brought on a new electronic counter measure (ECM) threat. This threat occurs when a high powered jammer uses its directional antenna and directs radio frequency (RF) energy at the ground (terrain), the energy then being reflected from the ground into the radar receiver of an adversary through the main lobe of the radar antenna. This presents a problem when the radar, while searching for a target when in a look down situation, has its main radar beam directed at the terrain which also has the jamming signal directed thereon. The clutter caused by the jamming signal which is reradiated from the terrain to the radar, when received through the main beam, adds with normal receiver noise to increase the noise floor or threshold of the receiver. This jamming technique is also referred to as producing "hot clutter". Depending upon the system design, the effect of this type of jamming can be many times worse than what the jammer level would be if the clutter were directed just at the side lobes of the radar. Accordingly, it is necessary to eliminate or at least greatly reduce the effect of hot clutter as above described on a high performance radar system. No prior art is known in connection with the solution to this problem.

SUMMARY OF THE INVENTION

In accordance with the present invention, there is provided a system and method for minimizing the effect of jamming of the type discussed hereinabove.

Briefly, a secondary beam is generated by the radar which is slightly offset from the primary data collection beam (sum beam) to obtain a hot clutter reference which is used in a conventional side lobe jammer processing algorithm, preferably a Gram-Schmidt algorithm. Advantage is taken of the typical geometries of a standoff jammer which provides nearly matched dispersion characteristics of the jammer RF when viewed with the two received beams. The important parameter is dispersion relative to the received bandwidth. The secondary beam, which may be an identical copy of the main sum beam, is offset from the primary beam by approximately two beam widths toward the jammer. The offset distance is chosen so that there is minimum and preferably no overlap in the main beam footprint on the ground and that of the secondary beam, but the footprints of the two beams are as close together as possible. If there is overlap, then there is a chance that the target will appear in both beams and therefore be suppressed. Accordingly, overlap must be minimized.

The signal processing hardware is configured with a conventional Gram-Schmidt algorithm with tapped delay lines feeding in the auxiliary ports or other appropriate cancellation algorithm. The number of auxiliary ports that are required depends upon the receiver bandwidth, the geometries of the jammer and the reflecting surface. The number of taps required is proportional to the receiver bandwidth.

Implementation requires the capability of generating the offset secondary beam. This is accomplished by adding another azimuth manifold with a slight phase offset. Alternatively, another set of phase shifters in azimuth can be used with another feed tied on the output of the phase shifters, allowing one to place the secondary beam between the jammer and the main beam independent of the pointing of the main beam relative to the jammer. The receiver requires a separate auxiliary channel and analog to digital converters and the processor requires additional taps to its jammer canceler processor. Typically, this requires adding taps but not a unique algorithm to process this data. An alternate approach to generating the azimuth beam is generating an auxiliary beam that can be pointed at the jammer itself. The advantage of this approach is to provide a better jammer to noise ratio. The disadvantage is that the jammer can point a spoofing signal or a signal that is at a different frequency of different noise content toward the receiver, thus the receiver would have the wrong canceling information. This alternate approach also requires a second set of phase shifters throughout the antenna array, increasing system cost and complexity. This reflective jammer canceler approach can also be applied to self protect reflective jamming. The geometries are typically worse from a dispersion view point but will still provide jammer suppression. Again, the amount of suppression is dependent upon exact geometries, receiver bandwidth and the number of delay line taps going into the jammer canceler.

Additional auxiliary beams can be used to provide improved performance.

In summary, this invention provides a method to greatly decrease the impact of a very serious ECM threat.

DESCRIPTION OF THE PREFERRED EMBODIMENT

Figure 1:
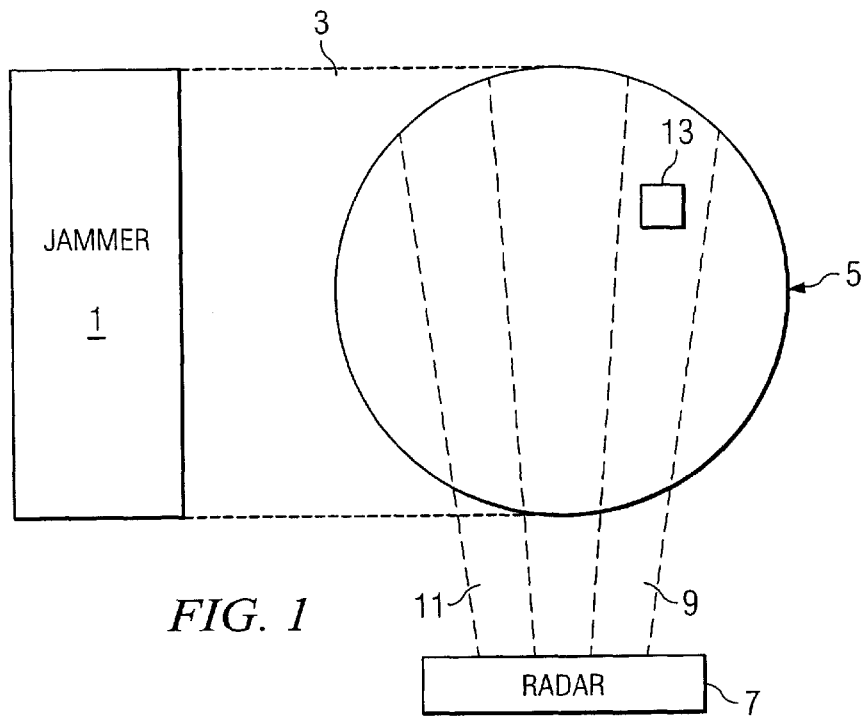
FIG. 1 is a schematic diagram of a system in accordance with the present invention.

Referring first to FIG. 1, there is shown a jammer 1 which transmits a jamming beam 3 onto the terrain whereby the jamming beam strikes the terrain in the area 5 and is reflected therefrom in a dispersive pattern. The radar 7 in accordance with the present invention forms a main beam 9 and a secondary or auxiliary beam 11 pointed onto the area 5, the reflected signal along the main beam providing clutter from the signal transmitted by the jammer and reflected from the terrain as well as background information and information indicative of the target 13. The reflected signal along the secondary beam provides clutter from the signal transmitted by the jammer and reflected from the terrain, but no target information. Since the main beam and secondary beam strike the terrain entirely within the area 5 and since there is no overlap of the main beam and the secondary beam, the target can be represented by only one of the beams, this being the main beam. Accordingly, since the reflected signal in the path of the secondary beam has the characteristics of the reflected signal in the path of the main beam except for the target information, cancellation of the jamming signal can be achieved with the information received from the two reflected beams, providing the information required relative to the target 13. Improved performance is obtained by using more than one secondary or auxiliary beam 11, each beam directed to a different region of area 5.

Figure 2:
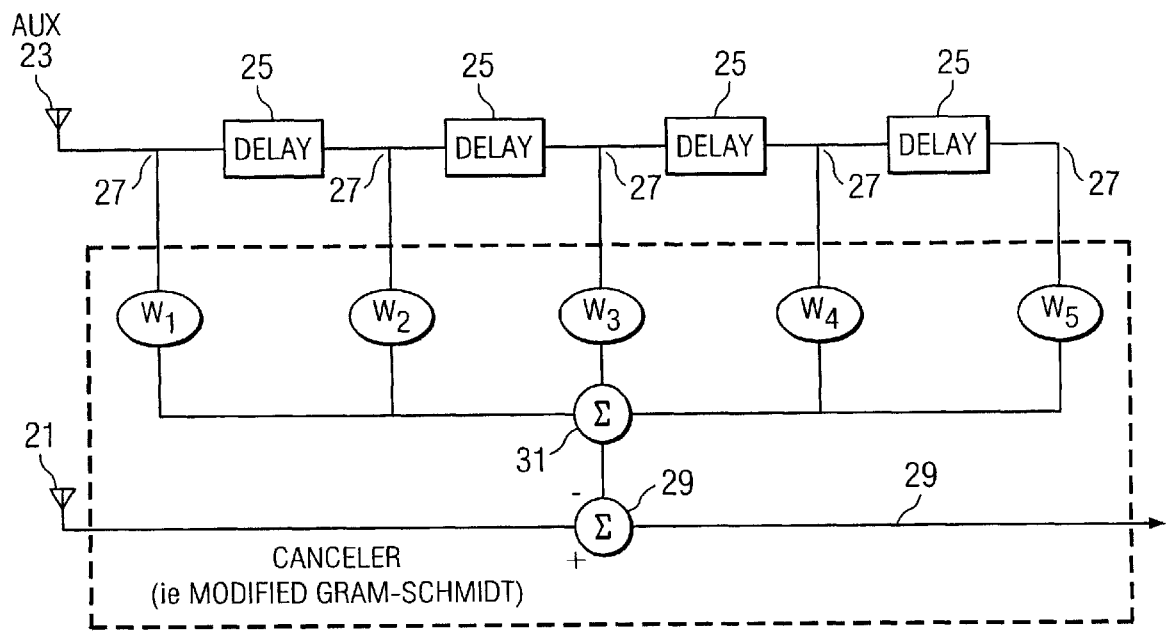
FIG. 2 is a circuit diagram of the hardware associated with the system of the present invention.

Referring now to FIG. 2, there is shown a circuit for receiving the reflected signals in the path of the main beam 9 and the secondary beam 11 and providing the clean output signal indicative of the target 13. There are shown a first antenna 21 for receiving the reflected signal in the path of the main beam 9 and an auxiliary antenna 23 for receiving the reflected signal in the path of the secondary beam 13. The reflected signal to antenna 21 is operated upon in conjunction with the reflected signal to antenna 23 using any standard algorithm for basic canceling, a modified Gram-Schmidt algorithm being preferred and used herein. The Gram-Schmidt algorithm is basically an adaptive procedure wherein the reflected signal to antenna 21 is compared with the reflected signal to antenna 23, the reflected signal to antenna 23 being delayed by delay elements 25 and tapped therefrom at various points 27. The reflected signal to antenna 23 and all tapped points of delay 27 are operated upon by the weighting functions W1 to W5. These signals are summed in a summer 31 and this sum is subtracted from the signal from antenna 21 in the subtractor 29. The algorithm (i.e. modified Gram-Schmidt or the like) determines the values of the weighting functions W1 to W5, these values depending upon the correlation of the corresponding tap 27 with the incoming signal in known manner. At this time, the signals from antennas 21 and 23 are subtracted from each other to cancel out the noise including the jamming signal with the resulting signal 29 being indicative of the target 13. The target information can now be classified in conjunction with a data base or otherwise used in standard manner.

While the radar 7 is shown as both a transmitter and a receiver, the transmitter and receiver operations can be physically spaced apart and be separate devices.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A method of suppressing noise due to jamming comprising the steps of:
    (a) transmitting a main beam and a secondary beam along separate, non-overlapping paths directed to a source of reflected jamming signals from the same source of said jamming signals;
    (b) receiving reflections of said main beam and said secondary beam as well as said reflected jamming signals in the reflection path of each of said main beam and said secondary beam; and
    (c) correlating said reflections and subtracting correlated portions of each of said reflections to provide signals indicative of a detected target.

2. The method of claim 1 wherein said reflections of said main beam and said secondary beam are received concurrently.

3. The method of claim 2 wherein said main beam and said secondary beam are offset from each other by about two beam widths.

4. The method of claim 2 wherein said step of correlating includes correlation in accordance with a modified Gram-Schmidt algorithm.

5. The method of claim 4 wherein said main beam and said secondary beam are offset from each other by about two beam widths.

6. The method of claim 2 wherein said main beam and said secondary beam are each radar beams transmitted and received by the same radar.

7. The method of claim 6 wherein said main beam and said secondary beam are offset from each other by about two beam widths.

8. The method of claim 6 wherein said source of reflected jamming signals is disposed on the ground and said radar is airborne.

9. The method of claim 8 wherein said step of correlating includes correlation in accordance with a modified Gram-Schmidt algorithm.

10. The method of claim 9 wherein said main beam and said secondary beam are offset from each other by about two beam widths.

11. The method of claim 8 wherein said main beam and said secondary beam are offset from each other by about two beam widths.

12. The method of claim 6 wherein said step of correlating includes correlation in accordance with a modified Gram-Schmidt algorithm.

13. The method of claim 12 wherein said main beam and said secondary beam are offset from each other by about two beam widths.

14. The method of claim 1 wherein said main beam and said secondary beam are offset from each other by about two beam widths.

15. The method of claim 1 wherein said main beam and said secondary beam are each radar beams transmitted and received by the same radar.

16. The method of claim 15 wherein said main beam and said secondary beam are offset from each other by about two beam widths.

17. The method of claim 15 wherein said source of reflected jamming signals is disposed on the ground and said radar is airborne.

18. The method of claim 17 wherein said main beam and said secondary beam are offset from each other by about two beam widths.

19. The method of claim 1 wherein said step of correlating includes correlation in accordance with a modified Gram-Schmidt algorithm.

20. The method of claim 19 wherein said main beam and said secondary beam are offset from each other by about two beam widths.

* * * * *